F. H. SIMONTON.
ENGINE DRIVING CONNECTION.
APPLICATION FILED JUNE 10, 1919.
1,362,901.
Patented Dec. 21, 1920.
Fig. 1,
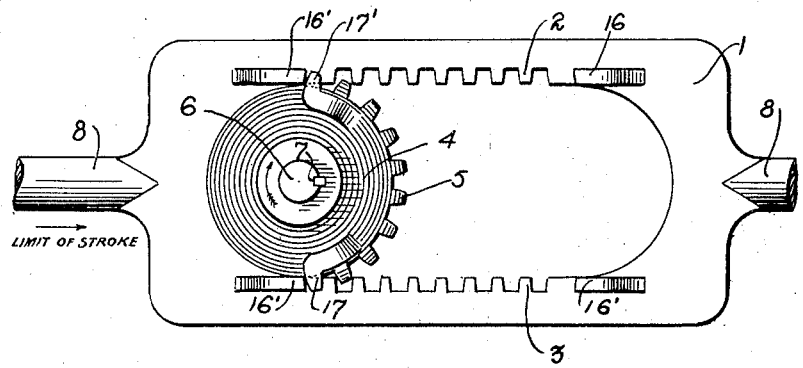
Fig. 2,
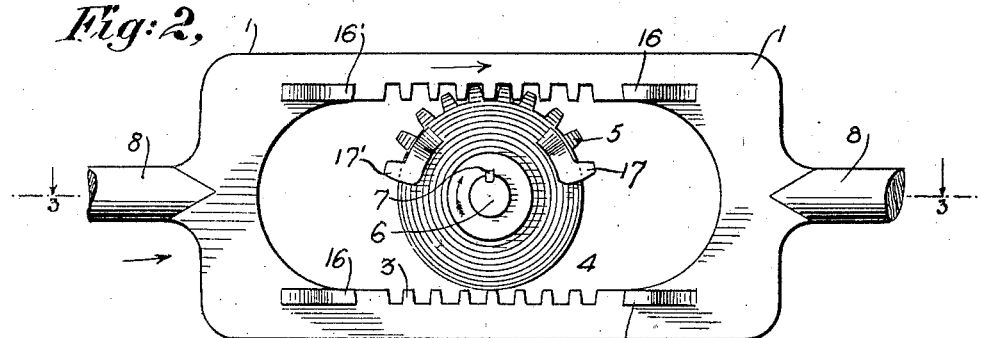
Fig. 3,
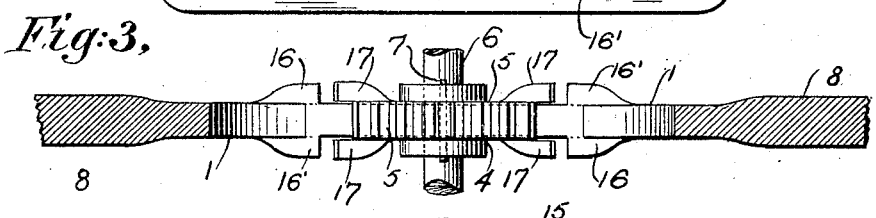
Fig. 4,
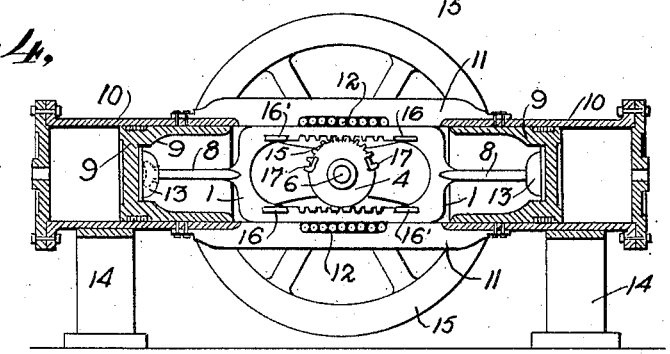
WITNESSES
E. A. Hagen
G. B. Gale
INVENTOR
Frank H. Simonton,
BY
ATTORNEYS

UNITED STATES PATENT OFFICE.

FRANK H. SIMONTON, OF NEW YORK, N. Y., ASSIGNOR OF FIFTY-ONE ONE-HUNDREDTHS PER CENT. TO ALFRED A. SMITH, OF NEW YORK, N. Y.

ENGINE DRIVING CONNECTION.

1,362,901.          Specification of Letters Patent.     Patented Dec. 21, 1920.

Application filed June 10, 1919. Serial No. 303,055.

*To all whom it may concern:*

Be it known that I, FRANK H. SIMONTON, a citizen of the United States, and a resident of the city of New York, borough of Manhattan, in the county of New York and State of New York, have invented a new and Improved Engine Driving Connection, of which the following is a full, clear, and exact description.

This invention relates to an improvement in engine drive connections and more specifically to that type of drive in which reciprocating motion is transformed into rotary motion without the use of the usual crank shaft and connecting rod.

One of the objects of this invention is to provide in an engine drive connection utilizing the direct force of a reciprocating power member, a means which will permit the said reciprocating motion to be translated directly into a rotary motion by a simple and rugged construction without the use of small spring actuated members, thus eliminating the necessity for the use of a crank shaft and a connecting rod which are usually employed. By such an arrangement the full power is transmitted directly to the rotary member throughout the entire length of the power stroke.

A further object of this invention is to provide in a driving connection comprising a sliding member having a plurality of rack surfaces thereon coöperating with a pinion having teeth on a portion of its circumference and alternately brought into engagement with the respective rack portions of the sliding member to obtain rotary motion from a reciprocating motion, a means which will facilitate in obtaining a reversal of the reciprocating member and which will permit a true meshing of the teeth of the rack and pinion without the danger of the teeth becoming locked at either of the limits of travel of the reciprocating member.

Heretofore certain devices have been used to accomplish the above objects but the use thereof has necessitated the use of many parts and a complex construction, which features are undesirable and are generally a source of trouble in operation.

A further object is to provide a device which will eliminate the objections above mentioned and which will permit the proper meshing and engaging of the teeth of the rack and pinion member throughout the travel of the reciprocating member.

The above objects are substantially accomplished by providing a straddle tooth construction wherein on the sliding rack member there is provided at a point spaced from the end teeth of the rack, a tooth which is offset from the main teeth, and on the rotating pinion there is further provided to coöperate with the straddle teeth of the slide at a point spaced from the end tooth on said pinion, another straddle tooth which also is offset from the main teeth of the rotating rack and which engages with the offset or straddle tooth of the sliding rack member at the limits of travel and facilitates in reversing the movement of the reciprocating member.

Other objects and advantages will be apparent from the following description and the accompanying drawings showing one of the preferred forms of the construction in which similar characters of reference designate like parts in the several views.

Figure 1 is an elevation showing the position of the sliding rack and pinion at one limit of travel.

Fig. 2 is an elevation showing the relative position of the sliding rack and the pinion at about midway between the limits of travel of the sliding rack.

Fig. 3 is a plan view, partly in section, taken on the line 3—3 of Fig. 2.

Fig. 4 is a view, partly in section, showing the connection of the reciprocating sliding rack with a cylinder and a flywheel mounted on the pinion shaft.

The preferred form of the invention herein shown comprises a sliding frame member 1 having gear teeth on the upper and lower members 2 and 3 thereof, the said toothed surfaces or racks being spaced to permit a rotary segmental gear 4 to rotate between them so that the gear teeth 5 may engage alternately with the teeth 2 and 3 of the racks when the sliding frame member 1 is reciprocated, thus changing a reciprocating movement of the frame member 1 to a rotating movement of the gear. The gear member may be fixed on a shaft 6 by a key 7 or any other suitable means.

In order that a reciprocating movement of the frame member 1 may be given, the said frame member may be connected by any suitable means, such as a rod 8, to a reciprocating member of any prime mover, as a piston 9, guided within a cylinder 10. The ends of the reciprocating frame member are rounded to conform substantially to the circumference of the gear so that at the limits of travel the said gear will clear the frame member at these points.

The sliding frame member is preferably supported by suitable guide members 11 in which the rack members are guided and reciprocated. In order to reduce the friction between the guides 11 and the sliding rack and frame members, any suitable roller bearings 12 may be used. In the construction shown two cylinders are used, the pistons of the respective cylinders being connected with opposite ends of the reciprocating member so that power is directly imparted thereto in each direction, but it is understood that I am not limited to the number of cylinders used. In the connection of the rod 8 to the piston 9 the connection is preferably made by a socket 13, which will permit a slight movement therebetween. The cylinders 10 are herein shown as being carried on suitable supports 14.

As is usual in nearly all reciprocating engines, there is provided a flywheel 15 on the shaft 6, which serves the usual purposes of flywheels. In devices heretofore constructed in which upper and lower reciprocating racks engage alternately with the rotary segmental gear in order to obtain rotary from a reciprocating movement, difficulty has been encountered in providing a proper arrangement and construction of the gear and rack members which will facilitate and permit a reversal of the reciprocating rack at the limits of travel thereof without encountering a locking action of the rack and segmental gear as the connection changed from the gear and the upper rack to the lower rack, or vice versa. In order to facilitate in the carrying out of this movement, there is herein provided a simple and rugged straddle tooth construction which comprises essentially the provision of coacting straddle teeth 16 and 17, which are spaced from the end teeth, laterally offset from and carried rigid with the reciprocating rack and the rotary segmental gear respectively. The straddle teeth 16 rigid with the reciprocating member are in longitudinal alinement with the main teeth 2, 3 of the rack, but laterally offset therefrom so that the straddle teeth are carried on each side of the rack so that at the limit of travel of the reciprocating rack the straddle teeth 17 of the segmental gear, axially offset from, but at the same distance from the center of the axis of the gear or on the same circumference as the main teeth of the gear, will engage the coacting straddle teeth 16 of the rack, thus obtaining a reversal of the reciprocating rack and the meshing of the respective rack and gear teeth without causing a locking of said teeth at either of the limits of travel. The inertia of the flywheel will tend to carry the gear over the center position when the rack has reached its limit of travel as in Fig. 1 and thus prevent any possibility of premature reversal of the rack and locking of the teeth. In other words, the momentum of the fly wheel will cause the teeth 17 at the bottom of the gear to act, momentarily, as the drivers in starting the rack on its reverse movement to the left, or until the next power stroke of the right cylinder is initiated, and by this time the teeth 3 will be operative to positively cause continued rotation of the gear and fly wheel.

In operation if the reciprocating member is driving the rotary gear in a given direction, for example as indicated by the arrows in Figs. 1 and 2, the coacting straddle teeth 16 and 17 at the bottom of the rack and gear respectively will engage at one of the limits of travel, and at the other limit of travel of the reciprocating member the same straddle tooth 17 of the gear will engage the straddle tooth 16 on the upper rack. If a reversal in the direction of rotation of the rotary gear is desired, the other straddle teeth 17 engaging at the limit of travel as in Fig. 1, the straddle teeth 16 at the top, may be caused to start the rack toward the left, the gear turning counter-clockwise. The functioning straddle teeth for any one direction of operation of the gear are located on diagonally opposite corners of the frame, and the straddle teeth of the gear coöperating therewith are always the leading teeth of the gear rack.

From the above arrangement it is seen that there is provided a simple and rugged construction eliminating the use of springs and small movable parts and other complicated constructions, whereby the reversal of direction of a reciprocating rack coöperating with a rotary segmental gear is greatly facilitated and the possibility of the teeth of the gear and rack becoming locked is eliminated.

I claim:

1. In a driving connection, the combination of a reciprocating frame comprising upper and lower spaced parallel racks, a pair of straddle teeth fixed to the end of one rack on opposite sides of and beyond the last tooth of the rack, a similar pair of straddle teeth fixed to the other end of the other rack and similarly on the opposite sides of the rack and beyond the last tooth thereof, a segmental gear journaled within the frame between said racks and having a series of teeth adapted to engage in alternation with the teeth of the several racks and having a pair of straddle teeth fixed on opposite sides of the gear just in advance of teeth of the gear and adapted to engage in alternation the straddle teeth of the racks to initiate the reciprocation of the frame in opposite directions, and means to control the reciprocations of the frame.

2. A device as set forth in claim 1 in which there are provided pairs of straddle teeth at both ends of each rack and also at both ends of the gear teeth.

FRANK H. SIMONTON.